July 24, 1951  R. S. COLLEY  2,562,018
DEMOUNTABLE RIVET STRUCTURE
Filed Oct. 1, 1946
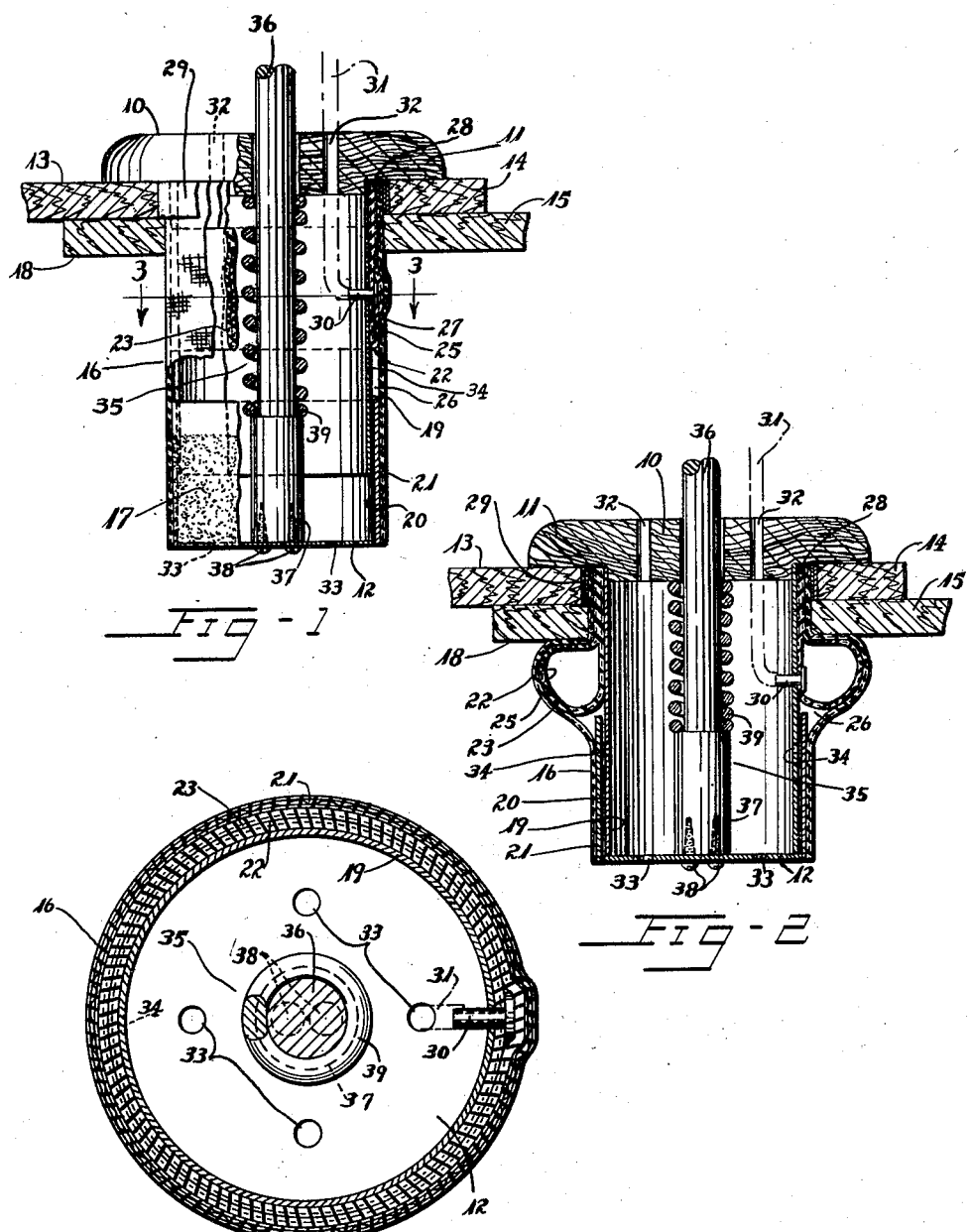
Inventor
Russell S. Colley
By
Att Patented July 24, 1951

2,562,018

UNITED STATES PATENT OFFICE 2,562,018

DEMOUNTABLE RIVET STRUCTURE

Russell S. Colley, Kent, Ohio, assignor to The B. F. Goodrich Company, New York, N. Y., a corporation of New York Application October 1, 1946, Serial No. 700,582

10 Claims. (Cl. 85—40)

1

The invention relates to rivet structures and especially to rivet structures suitable for holding parts temporarily together and for other purposes such, for example, as demonstrating the functioning of the rivet.

Demonstration of the functioning of hollow rivets for engineering, sales and other display purposes has been accomplished in the past as by applying one or more specimens of production rivets to sample parts in the presence of prospective users, or by the use of exhibits of the rivets already mounted on small plates of transparent material. Neither of these expedients has permitted repetitive demonstrations with the same rivet.

Screw fasteners and bolts, for example, have been used for holding parts temporarily together as for subsequent riveting. These and other temporary fastening devices have generally required considerable time and labor in applying and removing the same from the parts, and have not always been fully satisfactory to hold the parts in alignment or together.

Objects of the invention are to provide for overcoming effectively the disadvantages of the prior temporary fastening expedients, and to provide for demonstrating effectively the functioning of the rivet especially by repeated use of the same rivet.

Other objects are to provide an improved hollow rivet structure suitable especially for temporary holding purposes and for demonstrating purposes; to provide for circumferentially and locally expanding the wall of the rivet; to provide space for operating mechanism or other parts centrally of the rivet; to provide for expanding the rivet by annular expansible means; to provide for expanding the rivet and subsequently restoring the same to substantially its original condition; to provide for repetitive extension and contraction of the wall of the rivet; and to provide for simplicity of construction, convenience of manufacture, and for effectiveness of operation.

More specific objects are to provide for extending and contracting the wall of the rivet by inflation; to provide for telescopic operation of wall parts of the rivet; to provide for a composite wall construction of the rivet including in part elastic material therefor; and to provide for backing support of the elastic material while facilitating functioning of the rivet.

These and other objects and advantages of the invention will be apparent from the following description.

2

In the accompanying drawings which form a part of this specification and in which like numerals are employed to designate like parts throughout the same, Fig. 1 is a view showing a rivet structure before being expanded for joining parts of an assembly and constructed in accordance with and embodying the invention, parts being broken away and in section, Fig. 2 is an axially sectional view of Fig. 1 but showing the rivet in the expanded condition, parts being broken away, and Fig. 3 is a cross-sectional view taken along line 3—3 of Fig. 1.

In the illustrative embodiment of the invention shown in the drawings, the rivet structure is provided at one end with a seating portion 10 including an outwardly-extending annular flange 11, and at its other end the rivet may have an end wall 12 of stiff material such, for example, as aluminum alloy. The seating portions may be of wood, plastic, aluminum or other suitable stiff, distortion-resisting material and is disposed at a face 13 of parts or work-elements 14, 15 to be joined as by a face-to-face, overlapping and contacting relation. The wall of the rivet includes a tubular shank 16 adapted to be expanded outwardly and annularly adjacent the seating portion, which shank extends from the seating portion 10 through apertures in the parts and projects beyond the other face 18 of the joined parts.

The tubular shank 16 includes an inner wall portion 19, desirably cylindrical, of suitable distortion-resisting material, preferably aluminum alloy, secured to the seating portion 10 as by rubber cement or other fastening means. The inner wall portion 19 extends from the flanged end toward the closed end and is disposed in telescopic, relatively movable relation to an annular wall portion 20, desirably of aluminum alloy, united with and extending from the end wall 12 part way toward the seating portion 10 at the flanged end. The telescopic arrangement facilitates obtaining the expanded condition of the rivet with little or no distortion of the inner wall portion 19, as shown especially in Fig. 2. Such arrangement also facilitates returning the parts of the shank and the annular wall portion to their original extended condition, as shown especially in Fig. 1, in which latter condition the inner wall portion 19 terminates short of the end wall 12 a sufficient extent to permit the desired axial sliding movement of said parts and portion toward one another to the expanded condition of the rivet.

The tubular shank 16 has an outer wall portion 21, preferably cylindrical, of flexible, distortable material such, for example, as resilient rubber or other rubber-like material stretchable circumferentially of the shank from the diameter shown in Fig. 1 to the greater diameter shown in Fig. 2, and reinforced, if desired, as by woven textile fabric material. The outer wall portion 21 is secured to the inner wall portion 19 at the flanged end, and is secured to the annular wall portion 20 at the opposite closed end of the rivet 10 as by a suitable rubber cement 17 of the air-curing type. The outer wall portion is outwardly expansible relative to and in unattached relation to the inner wall portion 19 intermediate such attachments providing a space 26 between the wall portions for a pressure element 22, preferably a continuous annular inflatable tube of suitable rubber-like material having desirably a reinforcement 23 such, for example, as stretchable fabric in the wall thereof.

The annular inflatable tube 22 or pressure element having a central opening therethrough inwardly of its outer periphery 25 is mounted adjacent the seating portion 10 with the outer periphery 25 disposed in unattached relation to and conformingly entirely about the inner peripheral surface 27 of the outer wall portion at the region of expansion of the latter for facilitating the local expansion of the rivet. The inflatable tube 22 may include a peripheral flange portion 28 extending along the inner wall portion 19 toward the seating portion 10 and being sandwiched between and adhesively attached to the inner wall portion 19 and the outer wall portion 21 adjacent the flanged end of the rivet. A suitable wrapping 29 such, for example, as adhesive tape may be wrapped one or more times about such wall portions 19, 21 and peripheral flange portion 28 of the tube for further assuring a tight and secure union between the same.

For inflation purposes, a suitable connection 30 may extend through the inner wall portion 19 and the wall of the tube 22 in communication with the tube and with a source of pressure-fluid (not shown) such, for example, as compressed air as by a suitable conduit 31, which conduit may extend through the seating portion 10.

Both ends of the rivet may be of relatively closed construction, hence it is desirable that one or more end venting apertures 32, 32 and 33, 33 in the seating portion and end wall, respectively, and one or more venting apertures 34, 34 in the inner wall portion 19 of the shank be provided for exhausting and admitting atmospheric air upon expansion and extension of the rivet under the inflation and deflation of the annular inflatable tube. The arrangement avoids pressure differentials and uncontrolled bulging of the outer distortable wall portion by entrapped air within the rivet and facilitates ease of repetitive extension and contraction of the tubular shank 16 under the action of the inflatable tube.

Preferably, there is provided means 35 disposed within the shank between the flanged end and the opposite closed end of the rivet for assuring extending the shank 16 and the annular wall portion 20 telescopically to return their parts to their original condition upon deflation of the tube. For the arrangement shown in the drawings, the means 35 may have shaft 36 having desirably an enlarged end portion 37 secured to the end wall 12 as by screw fasteners 38, 38, which shaft 36 extends centrally and axially of the shank 16 through and beyond the seating portion 10 in sliding relation to the latter. A compression spring 39 is disposed about the shaft 36 between the seating portion 10 and the enlarged end portion 37 for urging the shank and the annular wall portion 20 to their extended relation one to another for the original condition of the rivet under deflation of the inflatable tube. For some applications of the invention such, for example, as when the rivet is mounted vertically, as shown in the drawings, the means 35, if desired, may be omitted, and the parts of the shank and the annular wall portion permitted to resume their original extended relationship under the action of gravity together with the tendency of the outer wall portion 22 to return to its original condition by virtue of the resiliency of the rubber-like material of the latter portion.

In the operation of the rivet when in assembled relation to the parts to be joined and in its non-expanded and original condition, as shown especially in Fig. 1, pressure-fluid is admitted to the annular inflatable tube 22 through the conduit 31 and connection 30, thereby distending the tube to substantially the otuwardly budged shape extending entirely about the tubular shank 16, as shown especially in Fig. 2. The distention of the tube causes little or no distortion of the metal inner wall portion 19 of the shank, but distorts and stretches the outer wall portion 21 to an outwardly bulged, annular shape adjacent the seating portion 10 and immediately at the face 18 of the parts 14, 15 providing an elastic clamping action on the parts 14, 15 between the flange 11 and the outward bulge of the outer wall portion 21. The bulging of the wall portion 21 induces telescopic movement of the inner wall portion 19 and the annular wall portion 20 toward one another to the contracted condition of the rivet, as shown in Fig. 2. The air within the rivet is exhausted to the atmosphere through the respective venting apertures. At the same time the spring 39 is compressed under the coincidental, axial movement of the shaft 36 and the end wall 12 toward the seating portion 10. In this manner, the rivet is placed and maintained in its expanded condition for holding the parts 14, 15 temporarily together by the elastic clamping action between seating portion and the outwardly bulged outer wall portion of the rivet.

When the inflated tube is deflated, it resumes its original flattened condition, as shown especially in Figs. 1 and 3, terminating the distortion of the outer wall portion to the bulged annular shape, thereby terminating the aforesaid clamping action temporarily holding the parts 14, 15 together. While the outer wall portion tends to return to its original condition by virtue of the resiliency of its material, such return may be assisted by the action of the compression spring which also tends to return to its original non-compressed condition upon deflation of the tube. This spring action causes the shaft 36 and end wall 12 to move axially away from the seating portion 10 thereby urging the inner wall portion 19 and annular wall portion 20 to move telescopically apart to their relatively extended and original position, as shown especially in Fig. 1. During such telescopic movement of the parts of the rivet, air re-enters the latter through the respective venting apertures facilitating such return action. Thus, the rivet is restored to its original condition for further use and expansion, repetitively or otherwise, as desired.

Variations may be made without departing from the scope of the invention as it is defined in the following claims.

I claim:
1. A tubular rivet structure adapted to be disposed in aligned apertures of work-elements in overlapping contacting relation and upset therein to temporarily hold said work-elements together, said rivet structure comprising a body having a headed end for engaging one of said work-elements at a face thereof and a tubular shank extending from said end for disposition through said apertures and beyond the opposite face of the other work-element, said shank comprising an inner wall portion of distortion-resisting material and an outer wall portion of elastic distortable material secured to said inner wall portion, and pressure means including a peripherally-extending pressure element secured to one of said wall portions and disposed between said wall portions in backing relation to said outer wall portion at a position spaced-apart from said headed end, one of said wall portions having a venting aperture therethrough adjacent said pressure element in communication with the atmosphere and the space between said wall portions said pressure element being constructed and arranged to expand peripherally of said shank for contracting axially said shank and at the same time locally expanding said outer wall portion to an outwardly bulged form to engage said opposite face of said other work-element in a manner temporarily clamping said work-elements between said headed end and the bulged outer wall portion, and said pressure element being constructed and arranged to contract peripherally of said shank for permitting said shank to return from its axially contracted condition and said outer wall portion to return elastically from its bulged form upon contraction of said pressure element and venting of air from said space between said wall portions.

2. A tubular rivet structure adapted to be disposed in aligned apertures of work-elements in overlapping contacting relation and upset therein to temporarily hold said work-elements together, said rivet structure comprising a body having a headed end for engaging one of said work-elements at a face thereof and a tubular shank extending from said end for disposition through said apertures and beyond the opposite face of the other work-element, said shank comprising an inner wall portion of distortion-resisting material and an outer wall portion of elastic distortable material secured to said inner wall portion, and a continuous annular pressure element material secured to one of said wall portions and disposed between said wall portions in backing relation to said outer wall portion at a position spaced-apart from said headed end for contracting axially said shank and at the same time locally distorting the outer wall portion to an annular outwardly bulged form when said pressure element is deformed in the upset condition of the rivet structure providing a continuous collar at said opposite face of said other work-element to elastically clamp said work-elements together between said headed end and said collar, one of said wall portions having a venting aperture therethrough adjacent said pressure element in communication with the atmosphere and the space between said wall portions for passage of atmospheric air to facilitate returning said shank from its axially contracted condition and returning elastically said outer wall portion from its bulged form upon release of said pressure element from its pressure condition.

3. A tubular rivet structure adapted to be disposed in aligned apertures of work-elements in overlapping contacting relation and upset therein to temporarily hold said work-elements together, said rivet structure comprising a body having a headed end for engaging one of said work-elements at a face thereof and a tubular shank extending from said end for disposition through said apertures and beyond the opposite face of the other work-element, said shank comprising an inner wall portion of distortion-resisting material and an outer wall portion of elastic distortable material secured to said inner wall portion at said headed end, and a continuous annular pressure element of elastic material having a closed chamber therein for receiving pressure-fluid and secured to said inner wall portion and disposed between said wall portions in backing relation to said outer wall portion at a position spaced-apart from said headed end for contracting said shank axially and at the same time locally expanding said outer wall portion to an annular outwardly bulged form under the pressure action of said pressure fluid upon said pressure element so that the annular bulge of said outer wall portion engages said opposite face of said other work-element to elastically clamp said work-elements together between said headed end and said annular bulge.

4. A tubular rivet structure adapted to be disposed in an apertured wall and upset therein in detactble engagement therewith, said rivet structure comprising a body having a headed end for seating against a face of the wall and a tubular shank extending from said end for positioning through the aperture of said wall, said shank comprising a pair of tubular elements in telescopic engaged relation for axial movement of one relative to the other, one of said elements including an expansible portion of distensible material, means mounted on said shank in the bore thereof at said expansible portion and being expansible and contractible peripherally of said shank for expanding said expansible portion peripherally thereof to detachably engage the other face of said wall and for moving one of said elements in one axial direction relative to the other element, and means supported by said body in said bore for moving one of said elements in the opposite axial direction relative to the other element and returning said expansible portion from its expanded shape.

5. A tubular rivet structure adapted to be disposed in an apertured wall and upset therein in detachable engagement therewith, said rivet structure comprising a body having a headed end for seating against a face of the wall and a tubular shank extending from said end for positioning through the aperture of said wall, the bore of said shank extending from said end and terminating in a closed end spaced-apart from said headed end, said shank comprising an inner wall portion of distortion-resisting material having a venting aperture therethrough intermediate said ends in communication with the atmosphere and an outer wall portion of elastic distortable material secured to said inner wall portion with an annular space between said wall portions at said venting aperture and intermediate said ends, an annular inflatable tube disposed in said space adjacent said headed end in annular conformance about and in backing relation to the inner periphery of said outer wall portion for receiving pressure-fluid and effecting axial contraction of said shank and at the same time local distortion of said outer wall portion to an annular outwardly bulged form for engaging the other face of the apertured wall under inflation of the tube, and means in communication with said tube for conducting pressure-fluid thereto for inflating the tube to distort said outer wall portion.

6. A tubular rivet structure adapted to be disposed in an apertured wall and upset therein in temporary engagement therewith, said rivet structure comprising a body for positioning in the aperture of the wall and having a flanged end for seating against a face of the wall and having a bore therein extending from said end and terminating in a closed end spaced-apart from said flanged end, said body comprising an annular wall portion extending from said closed end part way toward said flanged end, the wall of said body having a tubular shank comprising an inner wall portion of distortion-resisting material extending from said flanged end toward said closed end and disposed in telescopic relatively movable relation to said annular wall portion, and said shank comprising an outer wall portion of resilient rubber-like material attached to said inner wall portion at said flanged end and to said annular wall portion at said closed end and unattached thereto intermediate the positions of attachment providing a space between such wall portions and said outer wall portion, a closed annular inflatable tube disposed in said space between said inner wall portion and said outer wall portion adjacent said flanged end for expanding locally said outer wall portion to an annular outwardly bulged form to seat against the other face of the apertured wall under inflation of said tube, and means in said bore in communication with said tube for conducting pressure-fluid thereto to inflate said tube to expand said outer wall and to move said wall portions with relation one to another.

7. A tubular rivet structure adapted to be disposed in aligned apertures of work-elements in overlapping contacting relation and upset therein to temporarily hold said work-elements together, said rivet structure comprising a body for positioning through the apertures and having a flanged end for seating against a face of a work-element and having a bore therein extending from said end and terminating in a closed end spaced-apart from said flanged end, said body comprising an annular wall portion extending from said closed end part way toward said flanged end, the wall of said body having a tubular shank comprising an inner wall portion of distortion-resisting material extending from said flanged end toward said closed end and disposed in telescopic relatively movable relation to said annular wall portion, and said shank comprising an outer wall portion of resilient rubber-like material secured to said inner wall portion at said flanged end and to said annular wall portion at said closed end, a closed annular inflatable tube between the inner and outer wall portions and secured to said inner wall portion in backing relation to said outer wall portion adjacent said flanged end for expanding locally said outer wall portion to an annular outwardly bulged form to seat against the opposite face of the other work-element under inflation of said tube, conduit means carried by said body in communication with said tube for conducting pressure-fluid thereto for inflating said tube to expand said outer wall portion and to move said wall portions with relation one to another, and means including a shaft element disposed axially in said bore and secured to said body at said closed end thereof for extending said shank and said annular wall portion at said closed end telescopically to return their parts to their original condition upon deflation of said tube.

8. Apparatus for closing an aperture through a wall, said apparatus comprising a tubular body mounted on the wall and having a headed end seating against a face of the wall and a tubular shank of distortion-resisting material extending from said end through the aperture and beyond the outer face of the wall and a continuous annular outer wall of elastic material surrounding said shank and secured thereto at axially spaced-apart positions thereon with a space between the shank and outer wall intermediate said positions, a venting aperture in said shank in communication with the atmosphere and said space between said shank and outer wall, and a closed annular inflatable tube disposed in said space between said shank and outer wall adjacent said headed end for contracting said shank axially and at the same time expanding locally said outer wall to an annular outwardly bulged form seating against said other face of the wall under inflation of the tube, and conduit means supported by said body in communication with said tube for conducting pressure-fluid thereto to inflate said tube and expand said outer wall.

9. A tubular rivet structure adapted to be disposed in an apertured wall and subject to repetitive expansion and contraction to engage and disengage the wall, said rivet structure comprising a hollow body for positioning through the aperture of the wall and having closed ends with venting apertures therein and an outwardly-extending flange at one of said ends for seating against a face of the wall, said body having an annular wall portion extending from the other closed end part way toward the flanged end and positionable at the other face of the wall, the wall of said body having a tubular shank comprising an inner wall portion of distortion-resisting material extending from said flange toward said other closed end and disposed in telescopic relatively movable relation to said annular wall portion, said shank comprising an outer wall portion of resilient rubber-like material secured to said inner wall portion at said flanged end and to said annular wall portion at said other closed end and providing a closed annular space between the inner and outer wall portions, said inner wall portion being in communication with said space for venting the same into the bore of said shank to facilitate the relative movement of said wall portions, an annular inflatable tube disposed in said space between said inner and outer wall portions adjacent said flanged end for expanding locally said outer wall portion to an annular outwardly bulged form for detachably seating against said other face of the wall under inflation of said tube, and means in said bore and supported by said body and including a conduit in communication with said tube for conducting pressure-fluid to said tube to inflate and deflate repetitively said tube to expand and contract said outer wall portion and to move said wall portions with relation one to another.

10. A tubular rivet structure adapted to be disposed in an apertured work-element and upset therein in removable engagement therewith, said rivet structure comprising a body having a head end for seating against a face of the work and a tubular shank extending from said head end for disposition through the aperture and beyond the other face of the work, said tubular shank comprising an inner wall portion and an outer wall portion extending in telescopic disposition away from said head end toward the other end of said body and being attached together at said head end and disposed in unattached axially slidable relation beyond the attachment and at the region of said other end, said inner wall portion being of material resistant to radial distortion, said outer wall portion having an elastic annular wall portion spaced from said other end of the body and stretchable circumferentially of said shank, an inflatable annular pressure element between said inner and outer wall portions secured to one of the wall portions and backing said elastic annular wall portion and backed by said inner wall portion, whereby said outer wall portion is stretched locally at said elastic annular wall portion to an outwardly bulged form for engaging the other face of the work and by virtue of such stretching, relative axial sliding movement of said inner and outer wall portions at the region of said other end of said body is effected to contract said shank axially when said pressure element is inflated, and means for inflating said pressure element.

RUSSELL S. COLLEY.

REFERENCES CITED

The following references are of record in the file of this patent:

UNITED STATES PATENTS

| Number | Name | Date |
| --- | --- | --- |
| 658,588 | Reynolds | Sept. 25, 1900 |
| 1,710,439 | Taylor | Apr. 23, 1929 |
| 1,945,825 | Saxe | Feb. 6, 1934 |
| 2,178,494 | Richardson | Oct. 31, 1939 |
| 2,213,818 | Krause | Sept. 3, 1940 |
| 2,232,199 | Bald | Feb. 18, 1941 |
| 2,287,207 | Vedovell | June 23, 1942 |
| 2,324,520 | Lamson | July 20, 1943 |
| 2,341,502 | Ingres | Feb. 8, 1944 |
| 2,353,248 | Lamb | July 11, 1944 |
| 2,370,776 | Carlson | Mar. 6, 1945 |
| 2,409,433 | Hunter | Oct. 15, 1946 |

Certificate of Correction

Patent No. 2,562,018　　　　　　　　　　　　　　　　　　　July 24, 1951

RUSSELL S. COLLEY

It is hereby certified that error appears in the printed specification of the above numbered patent requiring correction as follows:

Column 2, line 21, for "portions" read *portion*; column 4, line 23, for "otuwardly" read *outwardly*; column 5, line 54, after "element" insert *of elastic*; column 6, line 31, for "detactble" read *detachable*; column 8, line 12, for "outer" read *other*; line 31, for "subject" read *subjected*;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*